United States Patent
Ong et al.

(10) Patent No.: US 12,387,495 B2
(45) Date of Patent: Aug. 12, 2025

(54) METHOD, SYSTEM AND COMPUTER READABLE MEDIA FOR OBJECT DETECTION COVERAGE ESTIMATION

(71) Applicant: NEC Corporation, Tokyo (JP)

(72) Inventors: Hui Lam Ong, Singapore (SG); Satoshi Yamazaki, Singapore (SG); Wen Zhang, Singapore (SG)

(73) Assignee: NEC CORPORATION, Tokyo (JP)

( * ) Notice: Subject to any disclaimer, the term of this patent is extended or adjusted under 35 U.S.C. 154(b) by 55 days.

(21) Appl. No.: 18/237,276

(22) Filed: Aug. 23, 2023

(65) Prior Publication Data

US 2023/0394833 A1   Dec. 7, 2023

Related U.S. Application Data

(63) Continuation of application No. 17/439,072, filed as application No. PCT/JP2020/013016 on Mar. 24, 2020, now Pat. No. 12,100,212.

(30) Foreign Application Priority Data

Mar. 26, 2019   (SG) .............. 10201902705S (51) Int. Cl.
  *G06V 10/00* (2022.01)
  *G06V 10/20* (2022.01)
  *G06V 20/52* (2022.01)
  *G06V 20/64* (2022.01)

(52) U.S. Cl.
  CPC .......... *G06V 20/52* (2022.01); *G06V 10/255* (2022.01); *G06V 20/647* (2022.01)

(58) Field of Classification Search
  None
  See application file for complete search history.

(56) References Cited

U.S. PATENT DOCUMENTS

| 9,565,400 | B1 | 2/2017 | Curlander et al. |
| 11,016,492 | B2 | 5/2021 | Gier et al. |
| 11,039,083 | B1* | 6/2021 | Levin .................. G06T 7/90 |
| 2011/0035199 | A1* | 2/2011 | Kristofik ............. G06F 30/20 703/6 |

(Continued)

FOREIGN PATENT DOCUMENTS

| CN | 103593641 A | 2/2014 |
| EP | 2808645 A1 | 12/2014 |

(Continued)

OTHER PUBLICATIONS

US Office Action for U.S. Appl. No. 17/439,072 mailed on Jan. 19, 2024.

(Continued)

*Primary Examiner* — Amir Alavi (57) ABSTRACT

Methods, systems and computer readable medium for object detection coverage estimation are provided. The system for object detection coverage estimation includes a camera and a processing means. The processing means is coupled to the camera to receive image data acquired by the camera, the image data including a detected object. The processing means is configured to determine a spatial coverage of the detected object based on detected object metadata associated with the detected object in the image data received from the camera.

13 Claims, 9 Drawing Sheets

(56) References Cited

U.S. PATENT DOCUMENTS

| | | |
|---|---|---|
| 2013/0163879 A1 | 6/2013 | Katz et al. |
| 2013/0182114 A1 | 7/2013 | Zhang et al. |
| 2014/0139427 A1 | 5/2014 | Hirai et al. |
| 2014/0347475 A1 | 11/2014 | Divakaran et al. |
| 2015/0029345 A1 | 1/2015 | Ikeda |
| 2017/0278254 A1 | 9/2017 | Ikeda et al. |
| 2018/0082440 A1 | 3/2018 | Nakamura et al. |
| 2020/0193628 A1* | 6/2020 | Chakraborty ....... G06F 18/2415 |
| 2021/0183041 A1 | 6/2021 | Li et al. |
| 2021/0278853 A1 | 9/2021 | Gier et al. |

FOREIGN PATENT DOCUMENTS

| | | | |
|---|---|---|---|
| JP | 2010-177741 A | | 8/2010 |
| JP | 2012-123667 A | | 6/2012 |
| JP | 5418072 B2 | * | 2/2014 |
| WO | WO-2005076621 A1 | * | 8/2005 ....... G08B 13/19606 |

OTHER PUBLICATIONS

M. Karakaya and H. Qi, "Coverage Estimation for Crowded Targets in Visual Sensor Networks", ACM Transactions on Sensor Networks, vol. 8, No. 3, Article 26, Jul. 2012, DOI: 10.1145/2240092.2240100.

Y. Xiang and S. Savarese, "Object Detection by 3D Aspectlets and Occlusion Reasoning", 2013 IEEE International Conference on Computer Vision Workshops, 2013, doi: 10.1109/ICCVW.2013.75.

C. Qian and H. Qi, "Coverage Estimation in the Presence of Occlusions for Visual Sensor Networks", Distributed Computing in Sensor Systems, 2008, doi: 10.1007 /978-3-540-69170-9_23.

M. Wang et al., "Camera Coverage Estimation Based on Multistage Grid Subdivision", ISPRS International Journal of Geo-Information, 2017, 6, 110, doi: 10.3390/ijgi6040110.

US Notice of Allowance for U.S. Appl. No. 17/439,072, mailed on Jun. 5, 2024.

International Search Report for PCT Application No. PCT/JP2020/013016, mailed on Jun. 30, 2020.

JP Office Action for JP Application No. 2021-554382, mailed on May 30, 2023 with English Translation.

US Office Action for U.S. Appl. No. 18/237,270, mailed on Dec. 17, 2024.

J. Kritter, M. Brevilliers, J. Lepagnot, and L.Idoumghar, "On the optimal placement of cameras for surveillance and the underlying set cover problem," Applied Soft Computing, vol. 74, pp. 133-153, Jan. 2019. doi:10.1016/j.asoc.2018.10.025 (Year: 2019).

US Office Action for U.S. Appl. No. 18/237,264, mailed on Dec. 6, 2024.

US Notice of Allowance for U.S. Appl. No. 18/237,270, mailed on Mar. 24, 2025.

* cited by examiner

METHOD, SYSTEM AND COMPUTER READABLE MEDIA FOR OBJECT DETECTION COVERAGE ESTIMATION

CROSS-REFERENCE TO RELATED APPLICATIONS

The present application is a continuation application of U.S. patent application Ser. No. 17/439,072 filed on Sep. 14, 2021, which is a National Stage Entry of international application PCT/JP2020/013016 filed on Mar. 24, 2020, which claims the benefit of priority from Singaporean Patent Application 10201902705S filed on Mar. 26, 2019, the disclosures of all of which are incorporated in their entirety by reference herein.

TECHNICAL FIELD

The present invention generally relates to computer vision, and more particularly relates to methods and systems for object detection coverage estimation.

BACKGROUND ART

Computer vision is an interdisciplinary field that includes methods for acquiring, processing and analysing digital images or videos to extract real world information for further decision. Object detection technologies involve using computer vision algorithms and image processing to provide computers the ability to identify real world object from digital images.

To detect an object in a digital image, computer processing scans an image segment by segment while performing pattern matching for each part of the target image. Image object detection processes are computer power intensive. As resolution per image increases (e.g., FHD, 4K), increased computer power is required for better accuracy as well as to reduce misdetection at higher frame rate (fps).

Conventional methods to reduce computing power requirements of image object detection include lowering the input image sequence frame rate (e.g., lowering from 15 fps to 5 fps), reducing image resolution by only processing identified areas of interest, and scaling down original image resolution (e.g., reducing 4K resolution to FHD resolution). Additional conventional methods for reducing computing power requirements of image object detection include limiting a detected object size (e.g., pixel size) by a specific minimum or maximum value or limiting detection objects by a specific maximum number of detections. Most object detection systems implement one or more of these conventional methods with configurations for different setup requirements and system constraint trade-offs.

SUMMARY OF INVENTION

Technical Problem

However, while most computer vision software allows trade-offs to be made by reconfiguring the software within system constraints in order to fulfil the requirements, this reconfiguring affects the effective processing coverage as the system can no longer cover the full area of a camera's view. This has become one of the challenges in deploying computer vision solutions as it is hard to provide estimated real-world spatial coverage information for better decision making as such estimated coverage information is very dependent on real-world criteria. Thus, what is needed is methods and systems for object detection coverage estimation which visualizes real-world spatial coverage of detected objects in a camera's view to provide computer vision which is aware of system constraints and requirement trade-offs for better decision making. Furthermore, other desirable features and characteristics will become apparent from the subsequent detailed description and the appended claims, taken in conjunction with the accompanying drawings and this background of the disclosure.

Solution to Problem

According to at least one embodiment of the present invention, a method for object detection coverage estimation is provided. The method includes acquiring image data from a camera, the image data comprising at least one detected object. The method further includes determining a spatial coverage of the at least one detected object in response to detected object metadata associated with the at least one detected object in the image data acquired by the camera.

According to another embodiment of the present invention, a system for object detection coverage estimation is provided. The system includes a camera and a processing means. The processing means is coupled to the camera to receive image data acquired by the camera, the image data comprising at least one detected object. The processing means is further configured to determine a spatial coverage of the detected object based on detected object metadata associated with the at least one detected object in the image data received from the camera.

And according to yet another embodiment, a computer readable medium for performing object detection coverage estimation is provided. The computer readable medium has instructions stored thereon for a processing means to determine a spatial coverage of at least one detected object from two-dimensional image data acquired by a camera. The spatial coverage of the at least one detected object is determined in response to detected object metadata in the two-dimensional image data associated with the at least one detected object in the image data by calculating the spatial coverage in three-dimensional coordinates of the at least one detected object in response to the two-dimensional image metadata associated with the detected object in the image data acquired by the camera and, further, in response to parameters of the camera using a pinhole camera model.

BRIEF DESCRIPTION OF DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

FIG. 1, comprising FIGS. 1A and 1B, depicts top planar views of detected objects, wherein FIG. 1A highlights large objects in the foreground and FIG. 1B highlights smaller objects in the background.

FIG. 5, comprising FIGS. 5A to 5E, depicts a method for calculating three dimensional spatial coverage of an object from two-dimensional image data in accordance with the present embodiments, wherein FIG. 5A depicts a top planar view of a camera view of detected objects, FIG. 5B depicts a side planar view of the camera and objects detected by the camera, FIG. 5C depicts a top planar view of the camera and objects detected by the camera, FIG. 5D depicts an exemplary object height for use in the calculation of the spatial coverage, and FIG. 5E a perspective view diagram of an exemplary calculation of the three-dimensional spatial coverage of the object.

FIG. 6, comprising FIGS. 6A and 6B, depicts top planar views of coverage area estimation in accordance with the present embodiments, wherein FIG. 6A depicts a top planar view of a nearest and furthest lines of the coverage area estimation and FIG. 6B depicts a top planar view of contour detection estimation of a dilated view of objects.

And FIG. 7, comprising FIGS. 7A and 7B, depicts top planar views of two aspects of object detection estimation in accordance with the present embodiments, wherein FIG. 7A depicts an estimation of detected object spatial coverage based on detected object metadata and FIG. 7B depicts an estimation of camera blind spots based on detected object metadata.

Skilled artisans will appreciate that elements in the figures are illustrated for simplicity and clarity and have not necessarily been depicted to scale.

DESCRIPTION OF EMBODIMENTS

The following detailed description is merely exemplary in nature and is not intended to limit the invention or the application and uses of the invention. Furthermore, there is no intention to be bound by any theory presented in the preceding background of the invention or the following detailed description. It is the intent of the present embodiment to present methods and systems for object detection coverage estimation which require less computing time than conventional methods and systems without the required trade-offs and/or constraints of such conventional methods and systems. In accordance with present embodiments, methods and systems to object detection coverage estimation can be used to determine detected object blind spots associated with the detected object.

Figure 1A:
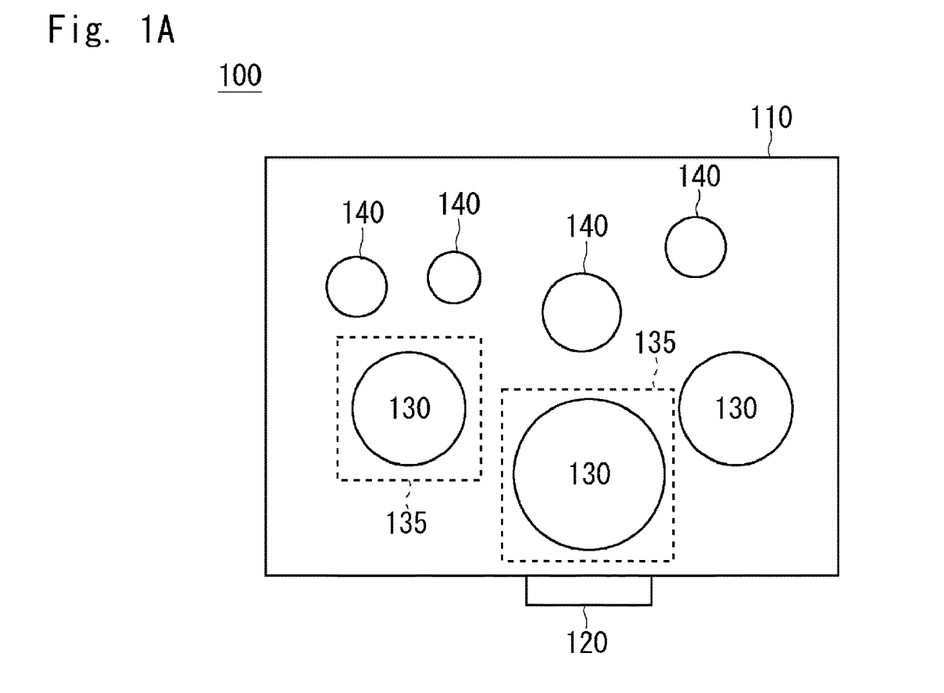
FIG. 1A depicts top planar views of detected objects.
Figure 1B:
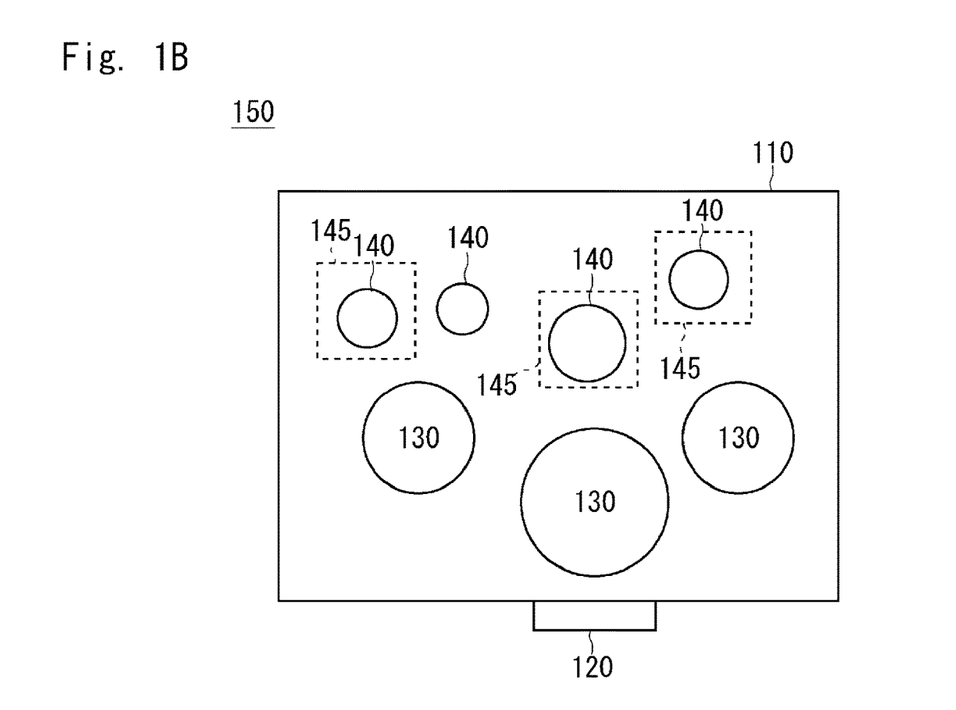
FIG. 1B depicts top planar views of detected objects.

Referring to FIGS. 1A and 1B, illustration 100, 150 depicts a top planar view of an area 110, the area 110 representing a camera view from a camera located at position 120. The area 110 includes several foreground objects 130 and several background objects 140. In accordance with image object detection processes, sometimes detected objects 130 are of interest to processing of images acquired from the camera located at the position 120 and sometimes detected objects 140 are of interest. In order to detect objects 130 or objects 140, it is necessary to estimate object detection spatial coverage 135, 145.

Figure 2:
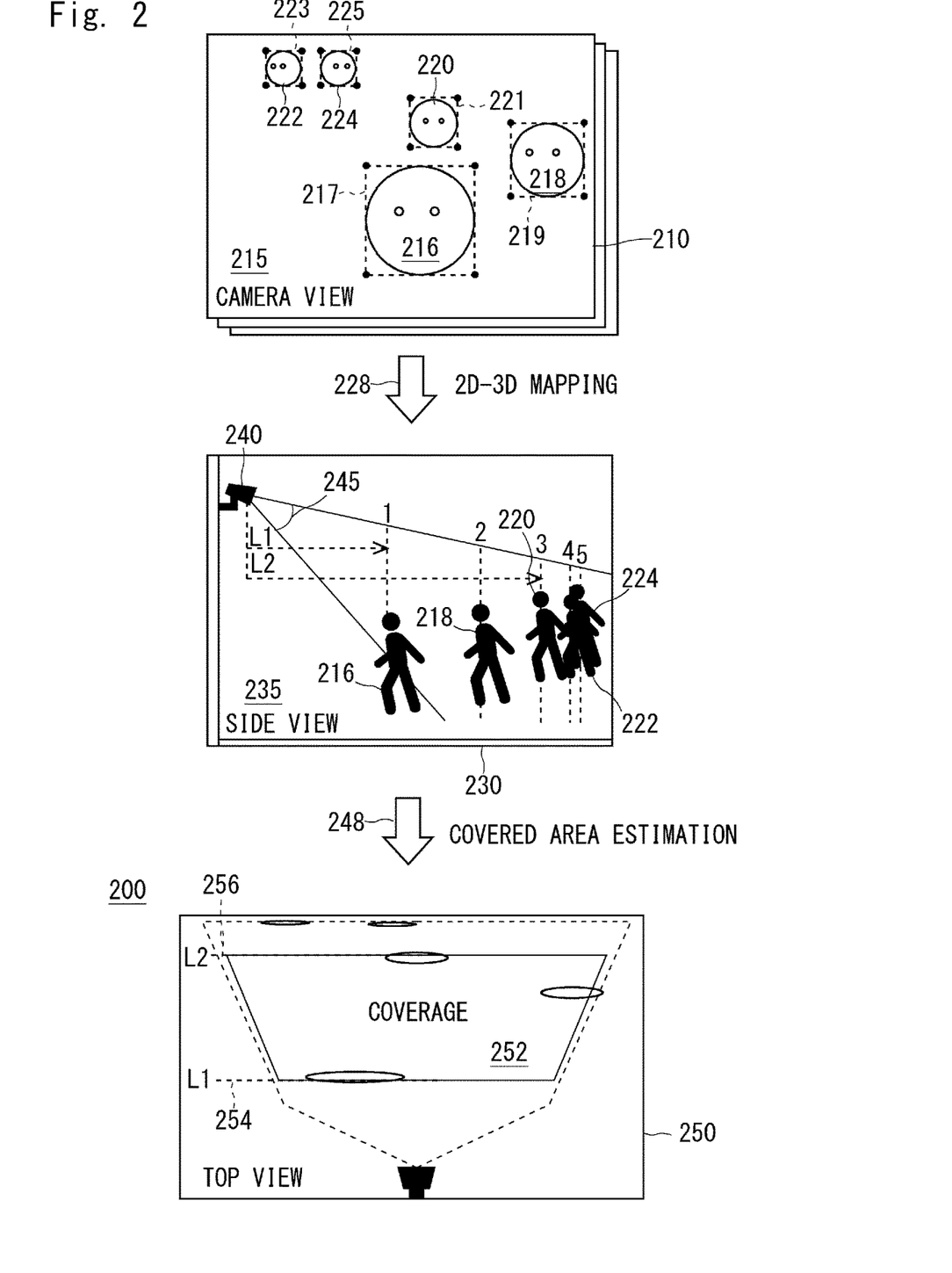
FIG. 2 illustrates a method for object detection coverage estimation in accordance with present embodiments.

Such estimation, however, is difficult in conventional computer vision systems because, while most computer vision software allows trade-offs to be made through configuration within system constraints to fulfil requirement, such trade-offs affect effective processing of detected object coverage. This has become one of the challenges in deploying computer vision solutions as it is hard to provide estimated real world spatial coverage information for better decision making. Referring to FIG. 2, an illustration 200 depicts views 210, 230, 250 of essential elements of methods and systems in accordance with present embodiments which advantageously estimate object detection spatial coverage using camera metadata and information from acquired images.

The view 210 of present methods and systems depicts image acquisition of a two-dimensional camera view 215 (i.e., input of object reference points in a two dimensional coordinate system). Persons 216, 218, 220, 222, 224 are detected objects having respective object reference points 217, 219, 221, 223, 225 in the camera view 215. In accordance with present embodiments for object coverage estimation, a two dimension (2D) to three-dimension (3D) mapping process 228 recreates virtual spatial coverage of the detected objects (people 216, 218, 220, 222, 224) from the metadata associated with the detected objects and from parameters of the camera 240 in order to determine the object reference points in a three-dimensional coordinate system. The virtual spatial coverage of the detected objects is shown in the view 230 as a side view 235 of image capture by the camera 240 having an image view 245 of the area 215.

Processing, in accordance with the present embodiments performs covered area estimation 248 as shown in the view 250. The view 250 depicts a calculated coverage area 252 in a top view coordinate system where the coverage area 252 has a front boundary L1 254 and a back boundary L2 256 which includes persons 216, 218, 220.

Figure 3:
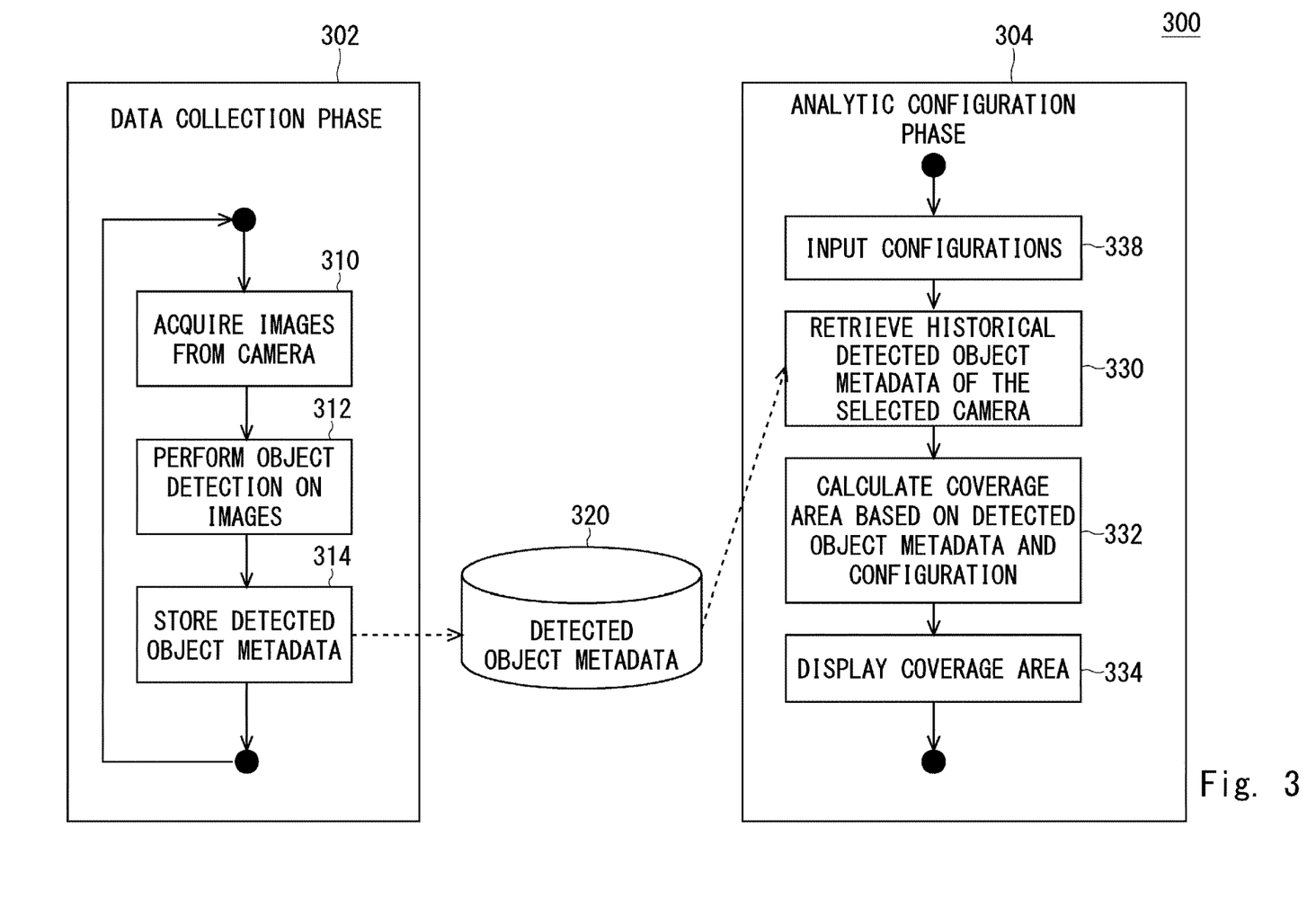
FIG. 3 depicts a flow diagram of a method for object detection coverage estimation in accordance with the present embodiments.

Referring to FIG. 3, a flow diagram 300 depicts a method for object detection coverage estimation in accordance with the present embodiments. The method includes a data collection phase 302 and an analytic configuration phase 304. In the data collection phase 302, image data is acquired 310 from the camera 240. The image data includes at least one detected object. Next, object detection is performed 312 on the acquired image data to generate two-dimensional detected object metadata. The detected object metadata is stored 314 in a data storage device 320 and the data collection phase returns to the image acquisition step 310.

The analytic configuration phase 304 retrieves 330 the detected object metadata from the data storage device 320.

If the computer vision includes multiple cameras 240, the retrieved detected object metadata is for a selected one of the cameras 240. The spatial coverage of the detected object(s) is determined 332 from the retrieved detected object metadata (i.e., the detected object two-dimensional image metadata) and camera configuration information (i.e., parameters of the camera). Determining the spatial coverage of the detected object(s) includes calculating spatial coverage in three-dimensional coordinates of the detected object(s) in response to the two-dimensional image metadata associated with the detected object(s) in the image data acquired 310 by the camera 240 and in response to the parameters of the camera using a pinhole camera model. The coverage area, including the estimated detected object coverage area, is then displayed 334.

In addition to estimating detected object spatial coverage, it is important to also determine blind spots associated with detected objects in for computer vision systems to better understand spatial views acquired by cameras 240. In accordance with present embodiments, the calculation step 332 may further include determining a detected object blind spot within the image data associated with each of the detected object(s) in response to the detected object metadata. The step 336 would also include determining quality of camera coverage in response to the detected object blind spot associated with each of the detected objects after displaying 334 the spatial coverage of the detected object(s) and the detected object blind spot(s) associated with each of the detected object(s).

Figure 4:
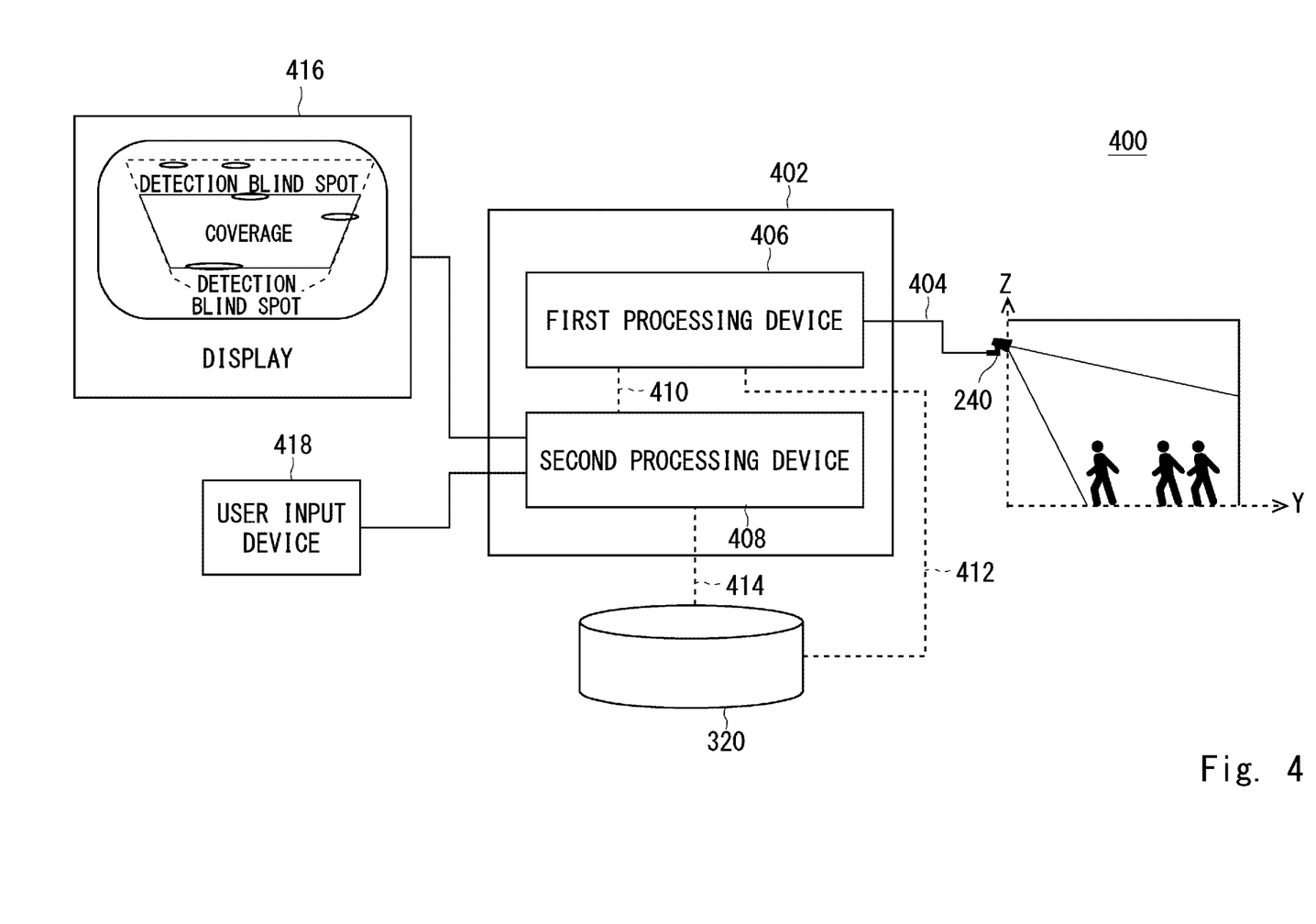
FIG. 4 depicts a block diagram of a system for object detection coverage estimation in accordance with the present embodiments.

FIG. 4 depicts a block diagram 400 of a system for object detection coverage estimation in accordance with the present embodiments. The system includes one or more cameras 240 for acquiring computer vision images. While the description of present embodiments has depicted a camera 240 and focused on acquisition of images form the camera 240, those skilled in the art will realize that a computer vision system typically includes many cameras. Systems and methods in accordance with the present embodiments can accommodate multiple cameras and detected object metadata acquired from each of the cameras during a data collection phase 302 for each camera can be centrally stored in the data storage device 320.

A processing means 402 is coupled to the camera(s) 240 to receive image data 404 acquired by the camera 240. The processing means 402 includes a first processing device 406 for receiving the image data 404 and performing the data collection phase 302 processing for each camera 240. The processing means 402 also includes a second processing device for performing the analytic configuration phase 304 processing. The first processing device 406 can directly provide 410 the detected object metadata to the second processing device 408 or, as described in regards to FIG. 3 above, provide 412 the detected object metadata to the storage device 320 for later retrieval 414 by the second processing device. Those skilled in the art will realize that the processing means 402 may be one server with multiple processors or may include multiple servers with multiple first processing devices 406 and/or multiple second processing devices 408. Thus methods and systems for object detection coverage estimation in accordance with present embodiments can provide a system configuration which can include a single second processing device 408 provided for multiple first processing devices 406.

The second processing device 408 is coupled to a display 416 for display of the spatial coverage of the detected object(s) for determining the quality of camera coverage and for observing the detected object(s). The second processing device 408 is also coupled to a user input device 418 for receiving user input for determining the quality of camera coverage and/or for receiving the inputted configurations 338. As described above, the second processing device 408 can determine the estimated coverage are for the detected object(s) as well as the detected object blind spot(s) within the image data associated with each of the detected object(s) in response to the detected object metadata.

In accordance with present embodiments, the first processing device 406 generates the detected object metadata by performing 312 object detection on the acquired image data. The second processing means 408 is configured to use a pinhole camera model to calculate the spatial coverage in three-dimensional coordinates of the detected object(s) from the two-dimensional image metadata associated with the detected object(s) and parameters of the camera. FIGS. 5A to 5E depict a method for calculating three-dimensional spatial coverage of the detected object(s) from two dimensional image data in accordance with the present embodiments.

Figure 5A:
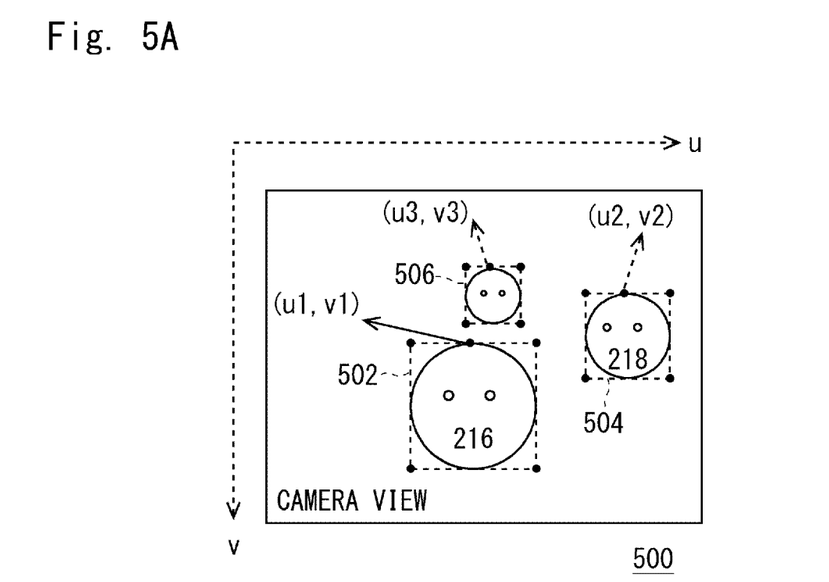
FIG. 5A depicts a method for calculating three dimensional spatial coverage of an object from two-dimensional image data in accordance with the present embodiments.
Figure 5B:
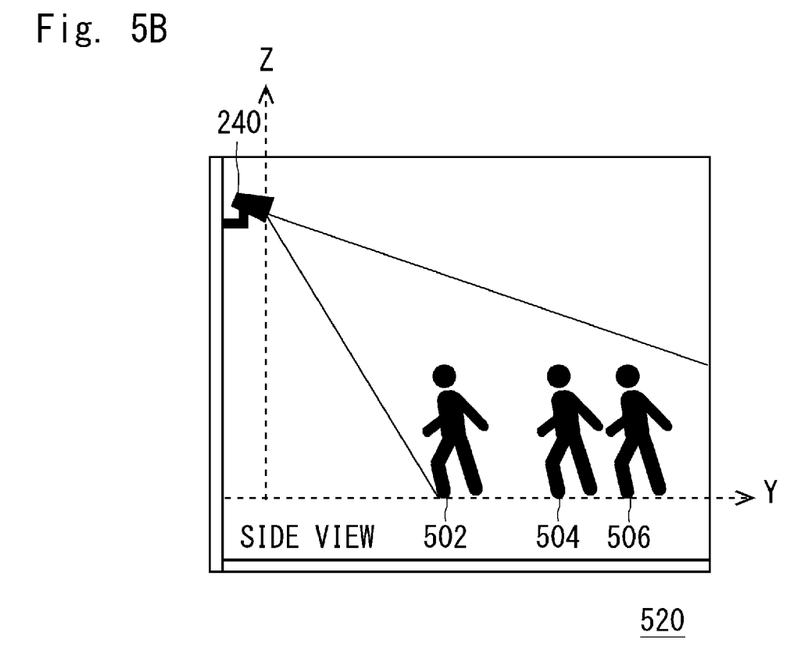
FIG. 5B depicts a method for calculating three dimensional spatial coverage of an object from two-dimensional image data in accordance with the present embodiments.
Figure 5C:
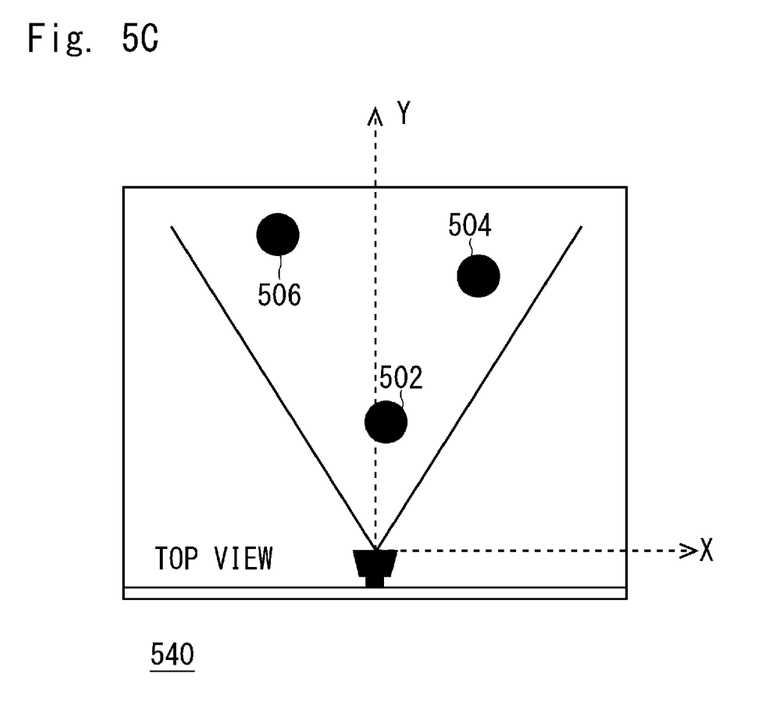
FIG. 5C depicts a method for calculating three dimensional spatial coverage of an object from two-dimensional image data in accordance with the present embodiments.
Figure 5D:
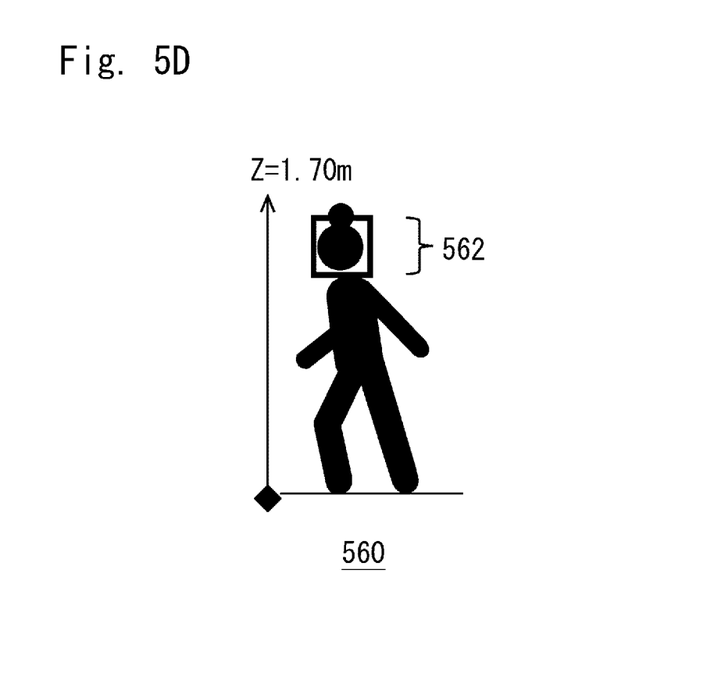
FIG. 5D depicts a method for calculating three dimensional spatial coverage of an object from two-dimensional image data in accordance with the present embodiments.

Referring to FIG. 5A, a top planar view 500 depicts a camera view of detected objects 502, 504, 506 having respective reference points in camera coordinates (u, v) of projection points of the detected object pixels in the acquired image data: (u1, v1), (u2, v2) and (u3, v3). Referring to a real-world spatial coordinate system XYZ, FIG. 5B depicts a side planar view 520 of the camera 240 and the objects (persons 502, 504, 506) detected by the camera 240 in the plane defined by the axis X and the axis Z and FIG. 5C depicts a top planar view 540 of the camera 240 and the objects 502, 504, 506 detected by the camera 240 in the plane defined by the axis X and the axis Y. FIG. 5D shows a side planar view 560 of reference dimension 562, chosen in accordance with one of the present embodiments as a typical head height of a human (1.70 meters).

Figure 5E:
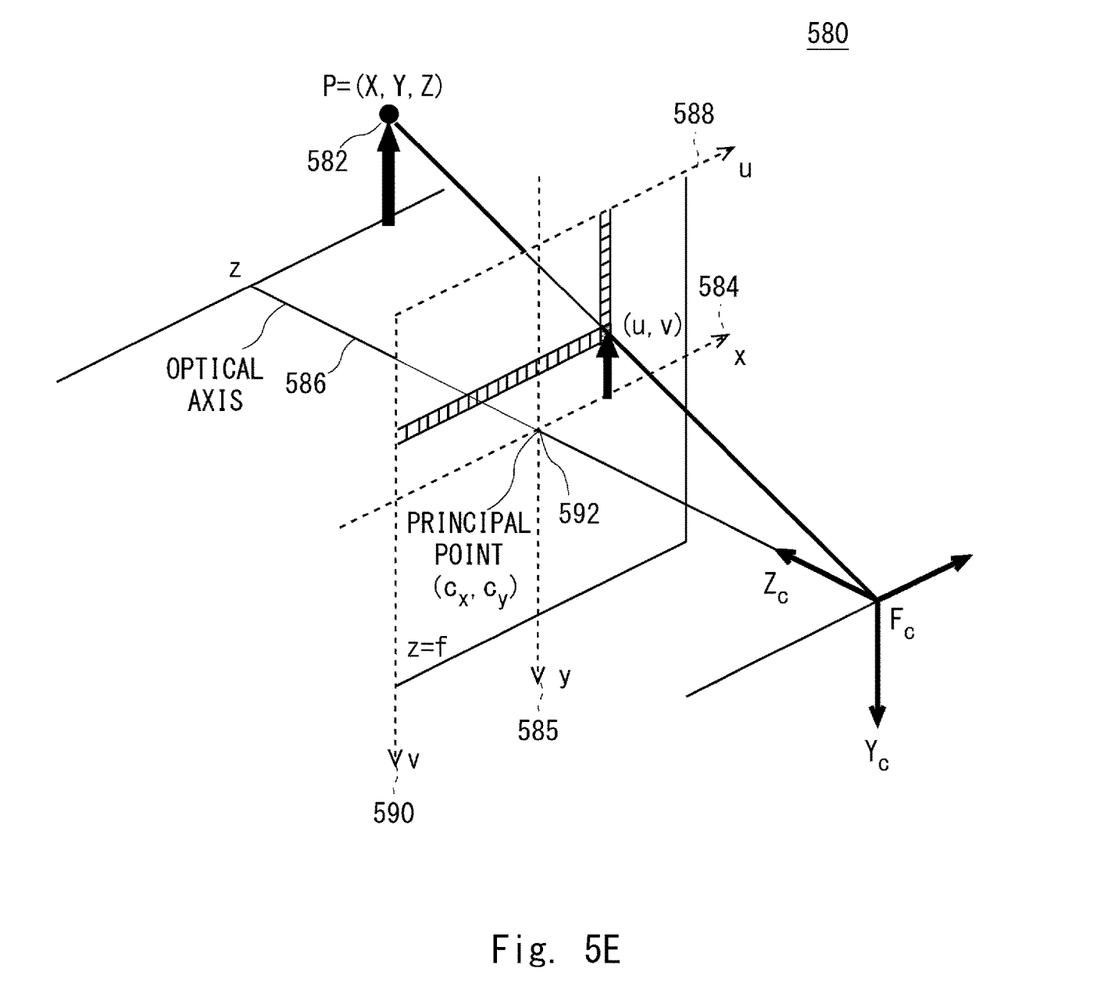
FIG. 5E depicts a method for calculating three dimensional spatial coverage of an object from two-dimensional image data in accordance with the present embodiments.

In accordance with present embodiments for object coverage estimation, a two-dimension (2D) to three-dimension (3D) mapping process 228 recreates virtual spatial coverage of the detected objects (people 216, 218, 220, 222, 224) from the metadata associated with the detected objects and from parameters of the camera 240 in order to determine the object reference points in a three-dimensional coordinate system. In accordance with one aspect of the present embodiments, a pinhole camera model is used as the mapping process. Referring to FIG. 5E, a perspective view 580 depicts an exemplary pinhole camera model mapping process which creates a virtual three-dimensional view by projecting three dimensional points generated from the metadata of the detected objects into the three-dimensional coordinate system using a perspective transformation as shown in Equations 1 to 5 wherein an input to the transformation includes the reference points of the detected objects in camera coordinates (u, v) and the reference dimension 562 (FIG. 5D) which is an estimated height of a detected object in the real-world coordinate Z. The output of the transformation is the set of real-world coordinates (X, Y).

$$\begin{bmatrix} x \\ y \\ z \end{bmatrix} = R \begin{bmatrix} X \\ Y \\ Z \end{bmatrix} + t \qquad (1)$$

$$x' = x/z \qquad (2)$$

$$y' = y/z \qquad (3)$$

-continued $$u = f_x * x' + c_x \quad (4)$$

$$v = f_y * y' + c_y \quad (5)$$

where X, Y and Z are the coordinates of a three-dimensional point P 582 in the real-world spatial coordinate system represented by x 584, y 585, and z 586 (where z 586 is typically the optical axis of the acquired image), u 588 and v 590 are coordinates of the projection points of the detected object pixels in the acquired image data, $f_x$ and $f_y$ are focal length parameters of the camera 240 (i.e., intrinsic camera parameters) expressed in pixel units, $c_x$ and $c_y$ which are coordinates of a principal point 592 in the acquired image, usually at the image center, x' 590, y' 591, and z' 592, t is extrinsic parameters of the camera 240 (for example, a matrix of extrinsic parameters of the camera 240), and R is another matrix of extrinsic parameters referred to as a joint rotational translation matrix. The joint rotational translation matrix is used to describe rigid motion of an object in front of the still camera 240 or, vice versa, motion of the camera 240 around a static scene. In other words, R translates the coordinates of a point (e.g., the point P 582) in the real-world spatial coordinate system to a coordinate system fixed with respect to the camera (i.e., the coordinate system x 584, y 585, z 586).

Figure 6A:
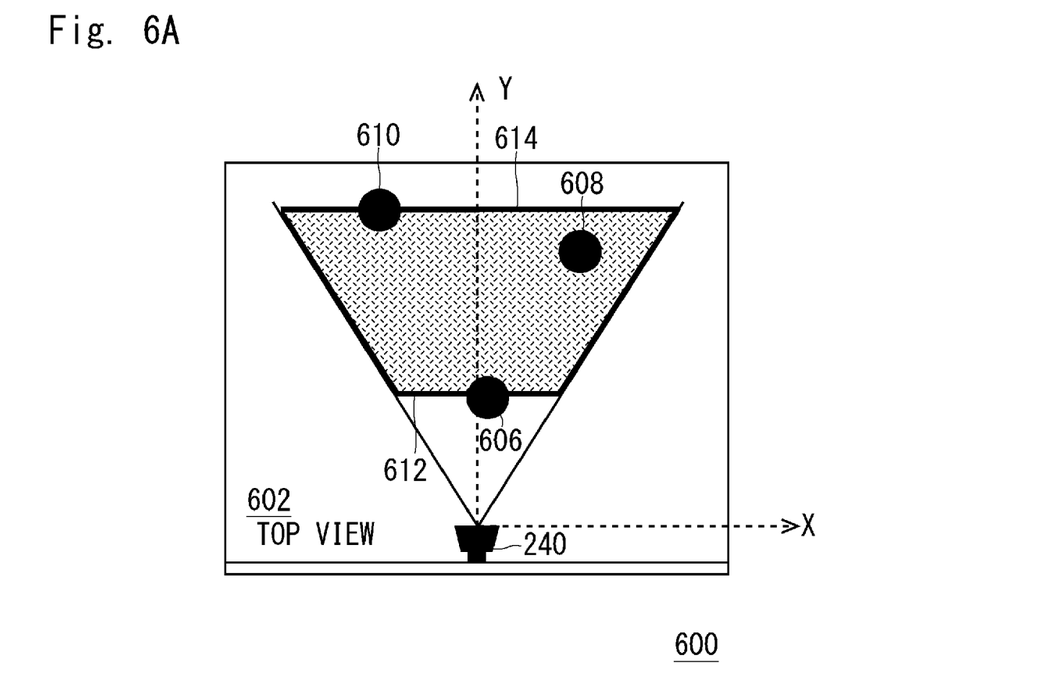
FIG. 6A depicts top planar views of coverage area estimation in accordance with the present embodiments.
Figure 6B:
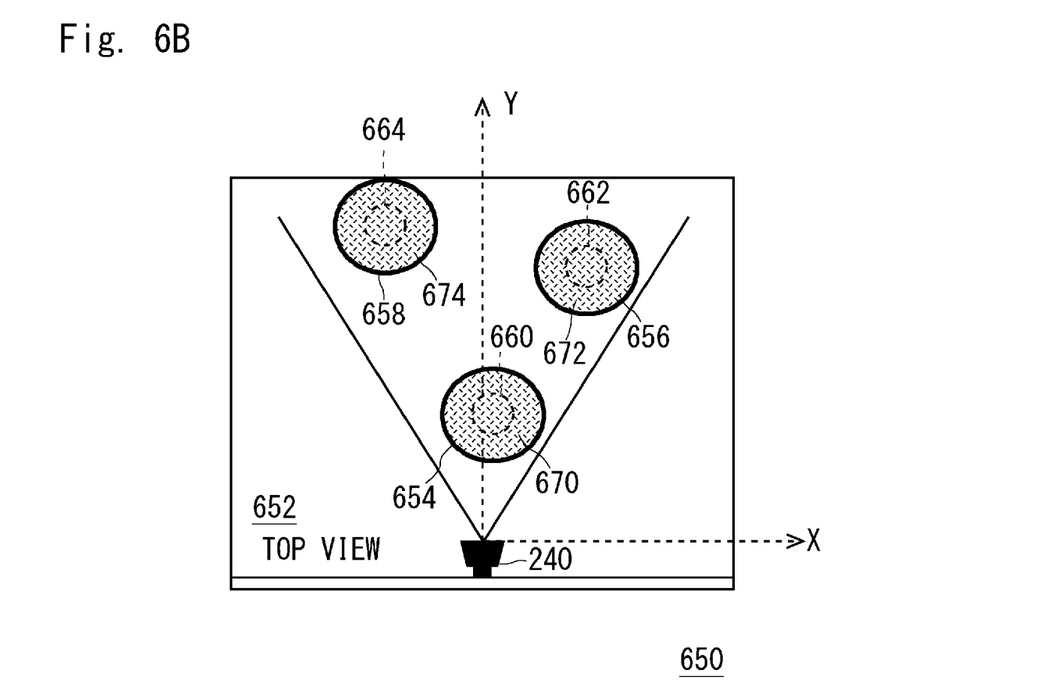
FIG. 6B depicts top planar views of coverage area estimation in accordance with the present embodiments.

Referring to FIGS. 6A and 6B, top planar views 600, 650 depict results of detected object coverage area estimation in accordance with the present embodiments. The view 600 depicts a camera view 602 wherein systems and methods in accordance with the present embodiments use a nearest and furthest line estimation technique to determine a spatial coverage estimation of a coverage area 604 for a first detected object 606, a second detected object 608 and a third detected object 610. The spatial coverage area estimation 604 is bounded by a nearest line 612 passing through the first detected object 606 and a furthest line 614 passing through the third detected object 610.

The view 650 depicts a camera view 652 wherein systems and methods in accordance with the present embodiments use a contour detection estimation of object dilated view technique to determine spatial coverage estimations of first, second and third detected objects 660, 662, 664. The contour detection estimation of object dilated view includes both morphological transformation (i.e., dilation) 670, 672, 674 of the detected objects 660, 662, 664 as well as contour detection 654, 656, 658 of the detected objects 660, 662, 664.

Figure 7A:
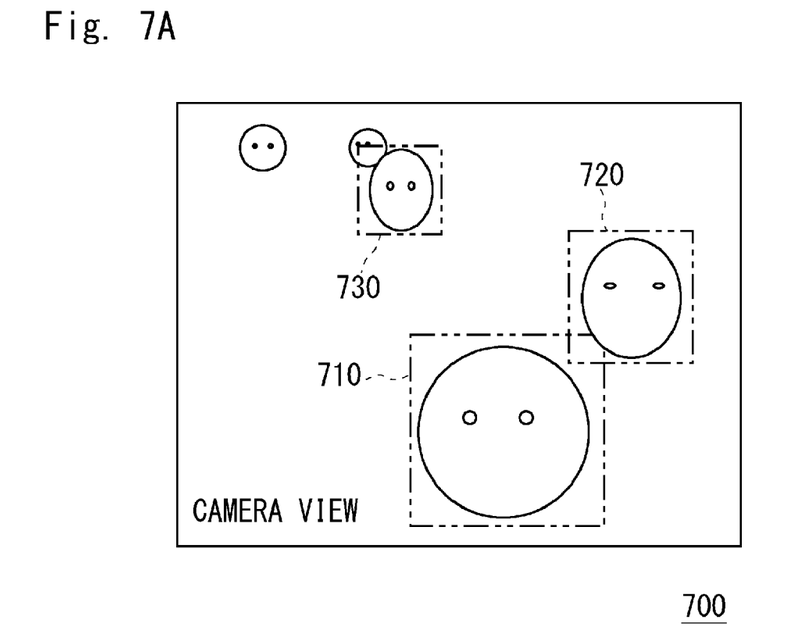
FIG. 7A depicts top planar views of two aspects of object detection estimation in accordance with the present embodiments.
Figure 7B:
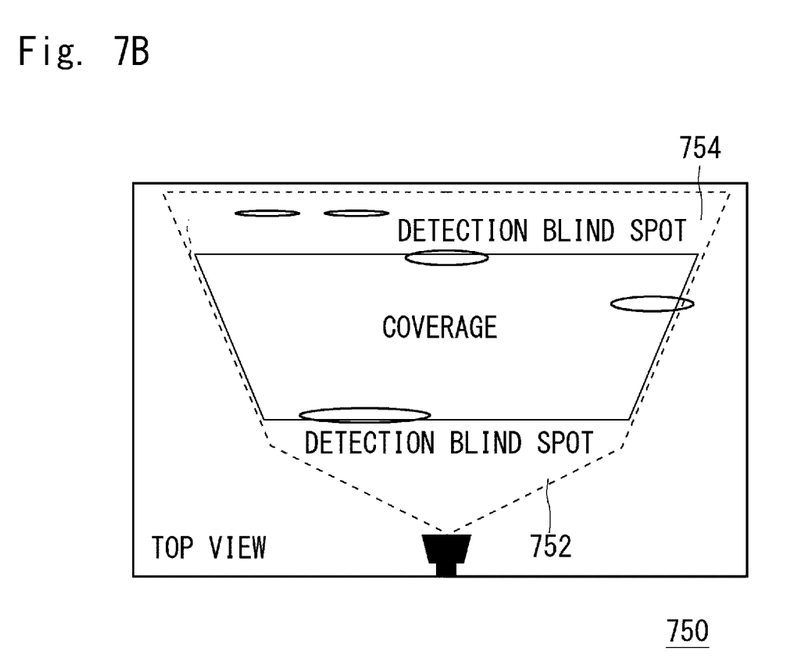
FIG. 7B depicts top planar views of two aspects of object detection estimation in accordance with the present embodiments.

FIGS. 7A and 7B depict top planar views of two aspects of object detection estimation in accordance with the present embodiments. FIG. 7A depicts a view 700 of one variation of the estimation of detected object spatial coverage 710, 720, 730 based on detected object metadata in accordance with the present embodiments. In accordance with a second aspect of the present embodiments, FIG. 7B depicts a view 750 of an estimation of camera blind spots 752, 754 based on detected object metadata.

Thus, it can be seen that the present embodiments provide methods and systems for object detection coverage estimation which advantageously visualizes real-world spatial coverage of detected objects in a camera's view to provide computer vision which is aware of system constraints and requirement trade-offs for better decision making. Not only spatial coverage of detected objects can be estimated in accordance with present embodiments, but detected object blind spots can also be identified. Computer vision systems utilizing methods and systems in accordance with present embodiments are more robust and require less time to estimate coverage area of detected objects thereby improving response time, decision making and accuracy.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

This application is based upon and claims the benefit of priority from Singapore patent application No. 10201902705S, filed on Mar. 26, 2019, the disclosure of which is incorporated herein in its entirety by reference.

The invention claimed is:

1. A system comprising:
a memory storing instructions; and
a processor connected to the memory and configured to execute the instructions to:
receive two-dimensional image metadata of a detected object detected from image data, the detected object being a person;
estimate spatial coverage of the detected object in three-dimensional space based on the received two-dimensional image metadata, camera configuration information of a camera that captured the image data, and information on a height of a predetermined person, the two-dimensional image metadata indicating coordinates of a top of a head of the person in the image data, the camera configuration information including information on an optical axis of the image data;
determine a blind spot associated with the detected object in the image data based on the two-dimensional image metadata;
output the estimated spatial coverage and the blind spot associated with the detected object;
determine a spatial coverage area including the spatial coverage of the detected object bounded by a nearest line passing through the detected object closest to the camera and a furthest line passing through the detected object farthest from the camera;
determine a coverage between the camera and the nearest line and a coverage that is away from the camera relative to the furthest line as the blind spot; and
output the determined spatial coverage area and the blind spot.

2. The system according to claim 1, wherein the processor is configured to execute the instructions to determine quality of camera coverage based on the blind spot associated with each detected object.

3. The system according to claim 1, wherein the processor is configured to execute the instructions to output the estimated spatial coverage as object detection coverage.

4. The system according to claim 1, wherein the processor is configured to execute the instructions to display the estimated spatial coverage and the blind spot on a display.

5. The system according to claim 1, wherein
the processor is configured to execute the instructions to
determine the spatial coverage of the detected object by
calculating spatial coverage in three-dimensional coordinates of the detected object based on the two-dimensional image metadata associated with the detected object in the image data and based on the camera configuration information of the camera using a pinhole camera model.

6. The system according to claim 1, wherein
the processor is configured to execute the instructions to
acquire the image data captured by the camera,
generate the two-dimensional image metadata by performing object detection on the acquired image data, and
store the generated two-dimensional image metadata in a data storage device.

7. The system according to claim 6, wherein
the processor is configured to execute the instructions to
retrieve the two-dimensional image metadata stored in the data storage device.

8. The system according to claim 1, wherein
the processor is configured to execute the instructions to
determine quality of camera coverage based on the spatial coverage of the detected object.

9. The system according to claim 8, further comprising
a display coupled to the processor, wherein
the processor is configured to execute the instructions to
forward data to the display to display the spatial coverage of the detected object for determining the quality of camera coverage.

10. The system of claim 1, further comprising
a user input device for receiving user input for determining quality of camera coverage.

11. The system according to claim 1, further comprising
a display coupled to the processor, wherein
the processor is configured to execute the instructions to
forward data to the display to display the spatial coverage of the detected object and the detection blind spot associated with each of the detected object for determining quality of camera coverage.

12. A method performed by a computer and comprising:
receiving two-dimensional image metadata of a detected object detected from image data, the detected object being a person;
estimating spatial coverage of the detected object in three-dimensional space based on the received two-dimensional image metadata, camera configuration information of a camera that captured the image data, and information on a height of a predetermined person, the two-dimensional image metadata indicating coordinates of a top of a head of the person in the image data, the camera configuration information including information on an optical axis of the image data;
determining a blind spot associated with the detected object in the image data based on the two-dimensional image metadata;
outputting the estimated spatial coverage and the blind spot associated with the detected object;
determining a spatial coverage area including the spatial coverage of the detected object bounded by a nearest line passing through the detected object closest to the camera and a furthest line passing through the detected object farthest from the camera;
determining a coverage between the camera and the nearest line and a coverage that is away from the camera relative to the furthest line as the blind spot; and
outputting the determined spatial coverage area and the blind spot.

13. A non-transitory computer readable medium storing a program executable by a computer to perform processing comprising:
receiving two-dimensional image metadata of a detected object detected from image data, the detected object being a person;
estimating spatial coverage of the detected object in three-dimensional space based on the received two-dimensional image metadata, camera configuration information of a camera that captured the image data, and information on a height of a predetermined person, the two-dimensional image metadata indicating coordinates of a top of a head of the person in the image data, the camera configuration information including information on an optical axis of the image data;
determining a blind spot associated with the detected object in the image data based on the two-dimensional image metadata;
outputting the estimated spatial coverage and the blind spot associated with the detected object;
determining a spatial coverage area including the spatial coverage of the detected object bounded by a nearest line passing through the detected object closest to the camera and a furthest line passing through the detected object farthest from the camera;
determining a coverage between the camera and the nearest line and a coverage that is away from the camera relative to the furthest line as the blind spot; and
outputting the determined spatial coverage area and the blind spot.

* * * * *